United States Patent
Lanfranchi

(10) Patent No.: US 9,286,699 B2
(45) Date of Patent: Mar. 15, 2016

(54) METHOD FOR PRODUCING AN IRIDESCENT IMAGE, IMAGE OBTAINED AND DEVICE INCLUDING SAME, ASSOCIATED PROGRAM

(75) Inventor: Christophe Lanfranchi, La Frette sur Seine (FR)

(73) Assignee: MEDIA RELIEF, Saint Ouen L'Aumone (FR)

( * ) Notice: Subject to any disclaimer, the term of this patent is extended or adjusted under 35 U.S.C. 154(b) by 108 days.

(21) Appl. No.: 14/124,745

(22) PCT Filed: Jun. 8, 2012

(86) PCT No.: PCT/FR2012/051294
§ 371 (c)(1),
(2), (4) Date: Feb. 24, 2014

(87) PCT Pub. No.: WO2012/168667
PCT Pub. Date: Dec. 13, 2012

(65) Prior Publication Data
US 2014/0153818 A1    Jun. 5, 2014

(30) Foreign Application Priority Data
Jun. 8, 2011    (FR) ...................................... 11 55003

(51) Int. Cl.
*G06K 9/00*    (2006.01)
*G06T 11/00*    (2006.01)
*G02B 27/22*    (2006.01)

(52) U.S. Cl.
CPC .......... *G06T 11/001* (2013.01); *G02B 27/2214* (2013.01)

(58) Field of Classification Search
None
See application file for complete search history.

(56) References Cited

U.S. PATENT DOCUMENTS

| | | | |
|---|---|---|---|
| 6,995,869 B2 * | 2/2006 | Onodera | 358/1.9 |
| 2003/0099406 A1 * | 5/2003 | Georgiev et al. | 382/268 |
| 2011/0226147 A1 * | 9/2011 | Trantoul et al. | 101/483 |
| 2012/0139906 A1 * | 6/2012 | Zhang et al. | 345/419 |

FOREIGN PATENT DOCUMENTS

| | | | | |
|---|---|---|---|---|
| EP | GB 2132136 | * | 7/1994 | ............. B42D 15/02 |
| EP | 1195721 | | 4/2002 | |

OTHER PUBLICATIONS

Shoup Richard G:, Color Table Animation; Computer Graphics, ACM, US, vol. 2, No. 13, Aug. 1, 1979, pp. 8-13; XP002075128.
Robert L Kooima et al: A GPU Sub-pixel Algorithm for Autostereoscopic Virtual Reality; Virtual Reality Conference, 2007, VR '07, IEEE, IEEE, PI, Mar. 1, 2007, pp. 131-137 XP031080304.

* cited by examiner

*Primary Examiner* — Daniel Mariam
(74) *Attorney, Agent, or Firm* — Gottlieb, Rackman & Reisman, P.C.

(57) ABSTRACT

The invention relates to a method for producing a series of modified images intended for forming an iridescent image, using at least one reference image, characterised by including steps of creating a color pallet (P); creating a series of at least two modified reference images (IRM0, IRM1, IRM2, IRMn, etc.), in which the colors of said at least one reference image (IR) are replaced with the colors of the pallet by applying, before or between each new modified reference image (IRM), a circular shift to the colors of the pallet. The invention also relates to the inter-laced, iridescent, 3-D images obtained using such a method, as well as to a device including such an interlaced image and an associated program.

14 Claims, 4 Drawing Sheets

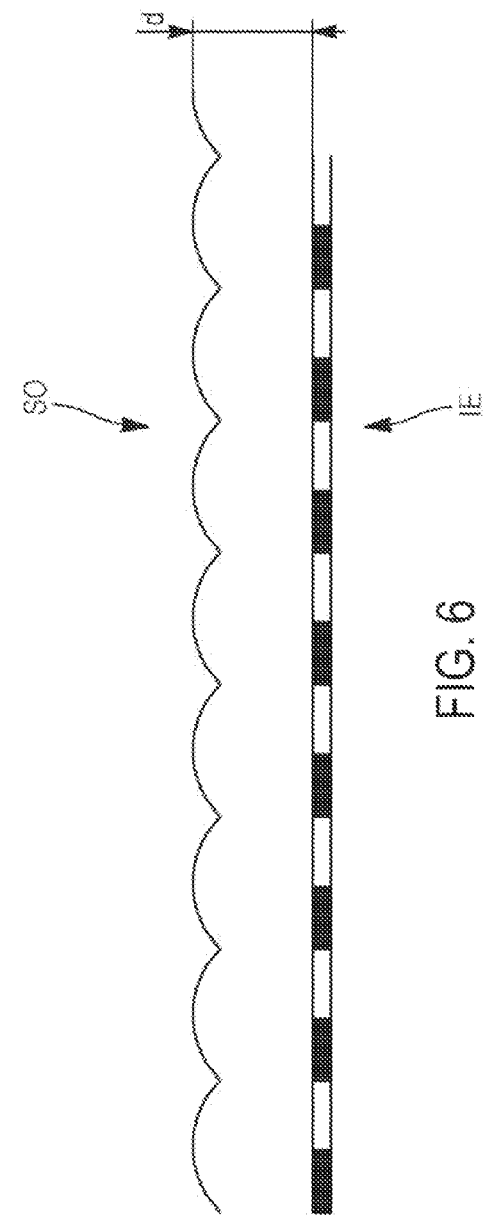
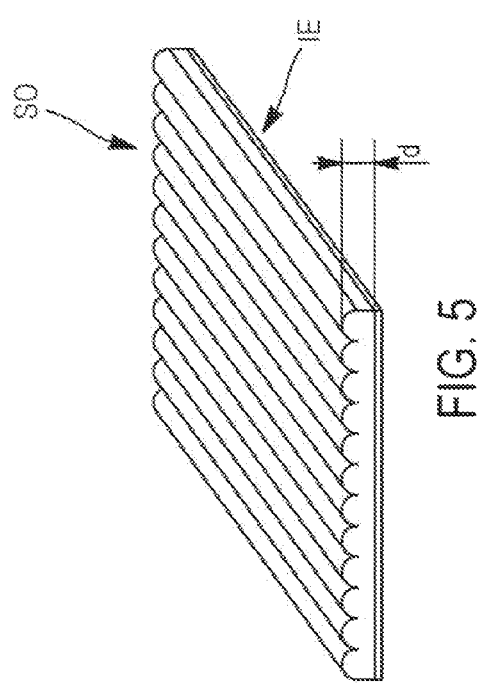
FIG. 5
FIG. 6

METHOD FOR PRODUCING AN IRIDESCENT IMAGE, IMAGE OBTAINED AND DEVICE INCLUDING SAME, ASSOCIATED PROGRAM

TECHNICAL FIELD OF THE INVENTION

The invention relates to the field of the creation of iridescent images. The iridescence effect occurs when our eyes, distant from each other, perceive, from the same object, different colours and/or light intensities. Such images are for example used for achieving a more aesthetic display on product packages. Thus effects result that are eye-catching and prominent for the consumer.

An image of this type can also be provided on a bank or telephone card, a shop window, a decoration, a press dossier, a greetings card, a garment or footwear marking, or a communication element such as a business card. This type of effect can also be provided in 3D images, for example in a 3D cinema or 3D games, etc.

PRIOR ART

Many methods for creating images with moiré effect have been proposed. Thus, through the document EP 1 147 878, a moiré or iridescent pattern produced from a matrix of lenticular elements printed on at least one surface of a substrate is known. This device does not however prove to be completely satisfactory. This is because this document does not make it possible to easily produce an iridescent image from a given reference image such as a drawing, a photograph or a text.

DISCLOSURE OF THE INVENTION

The invention aims to remedy the drawbacks of the prior art mentioned above and to provide other types of application.

To do this a method is proposed for producing a series of at least two modified reference images intended to form an iridescent image, from at least one reference image.

In general terms, the method according to the invention comprises steps of creating a palette of colours and creating a series of at least two modified reference images, in which the colours of said at least one reference image are replaced by colours in the palette by effecting, before or between each new modified reference image, a circular shift of the colours in the palette.

According to a first aspect of the invention, the method is implemented using a reference image.

According to a second aspect, the method is implemented using at least two reference images.

"Reference image" means an image that represents, to within the colours, what is perceived of the iridescent image. The reference image may represent for example a drawing, a photograph or a text. Preferably the colour mode of the reference image is adapted to the reproduction system used.

According to a preferred variant, the method also comprises a step of applying a fuzziness to all or part of the reference image, before the step of creating the modified reference images.

According to another preferred variant the step of creating the modified reference images is performed by means of at least one mask covering at least part of the reference image.

"Iridescent image" means the series of at least two modified reference images put in relationship with an optical selector enabling an observer to perceive with both eyes different images of said series.

"Palette of colours" means an index table where each value in the table represents a colour. The colours contained in this palette will give their colours to the iridescence effects in the iridescent image obtained.

"Circular shift" means a rotation of the colours in the palette as if the left and right ends of the palette were joined. The colour that is inserted on the left during a shift to the right is the colour that is shifted and output to the right and vice versa.

In general terms the colour mode of the palette is adapted to the reproduction system used and may represent either a single layer of colour, in bitmap or grey level, or three red green blue layers, or four cyan magenta yellow black layers. Advantageously, the palette comprises either a single colour layer, in bitmap or grey level, or two layers of colours the lightest of which is a constant value over the whole of said palette.

Preferably, the method comprises a step of creating at least two reference images from a series of preference images selected in the group containing a multiscopic series, an animation, and the step of creating a series of modified reference images is then performed on each of said at least two reference images in order to create, for each of them, at least one modified reference image.

"Optical selector" means a device enabling an observer to perceive with both eyes different images in the series of at least two modified reference images, thus enabling him to perceive the iridescence effects.

Then "autostereoscopic optical selector" is spoken of when the selector does not require the wearing of specific spectacles or require the use of a stereoscope. Such an optical selector is for example an array of linear lenses, also referred to as a lenticular array, which comprises longitudinal cylindrical lenses. Such an optical selector may also be an array of spherical lenses, or a parallax barrier. In general terms, a parallax barrier comprises lines, circles, ellipses, squares, diamonds, zigzags, etc, the size and frequency of which are preferably fixed, and which may be printed, etched, moulded, sandblasted or deposited hot on or in a transparent or translucent substrate, for example made from PVC, glass, Plexiglass® (polymethyl methacrylate), etc, thus presenting a periodic structure of transparent, translucent or opaque areas. The optical selector may also comprise reserve areas (masks) if it is wished for the iridescent image not to have an iridescence effect over the whole of it.

A holographic film may also be considered to be an autostereoscopic optical selector. Autostereoscopic video screens are also found based on the use of lenticular arrays, parallax barriers or other devices.

A non-autostereoscopic optical selector is for example a stereoscope or stereoscopic spectacles selected from the group comprising spectacles using coloured or polarising filters, LCD obturation spectacles, Infitec® spectacles or prismatic spectacles.

According to a first advantageous variant, the method comprises a step of creating an interlaced image from said modified reference images.

Preferably, the method according to this first advantageous variant comprises a step of putting the interlaced image in relationship with an autostereoscopic optical selector in order to obtain an iridescent image. Such an autosteroscopic selector is preferably selected from the group comprising an array of cylindrical lenses, an array of spherical lenses, a parallax barrier or an autostereoscopic screen.

The putting of the interlaced image in relationship with the optical selector in order to obtain the iridescent image may consist of a reproduction of the interlaced image preferably formed on the face of the optical selector opposite to the observer, or a lamination on this face while providing a necessary space between the optical selector and the interlaced image for focal reasons explained below. The interlaced image formed may also be reproduced on a face of the optical selector by etching, moulding, sandblasting or any other method allowing such reproduction. Thus the putting in relationship consists for example of a reproduction such as printing, etching, moulding, sandblasting. In the case of etching in a block of glass, the interlaced image is etched leaving a focal distance detailed below between the parallax barrier and the interlaced image. The interlaced image formed may also be displayed on an autostereoscopic screen, and the step of creating the interlaced image will then be adapted to the type of screen used.

According to a second advantageous variant, the series of modified images us configured so as to be observed through a non-autostereoscopic selector preferably chosen from the group comprising a stereoscope or stereoscopic spectacles selected from the group comprising spectacles using coloured or polarising filters, LCD obturation spectacles, Infitec® spectacles or prismatic spectacles. In the same way, the iridescent image may also be configured so as to be observed through the same type of non-autostereoscopic selector.

Preferably, when the reference images consist of a stereoscopic pair or a multiscopic series generated by a 3D image creation program, the creation of the series of modified reference images may directly be generated by said program using a palette of colours for the textures of all or some objects making up the scene and effecting a circular shift of the colours of the palette before or between the calculation of each modified reference image.

The invention also relates to an interlaced image derived from a series of at least two modified reference images obtained from at least one reference image, the colours of which have been replaced by the colours of a palette of colours by effecting, before or between each new modified reference image, a circular shift of the colours of the palette.

Another subject matter of the invention consists of an iridescent image comprising an interlaced image described previously, or obtained by the method according to the first advantageous variant described previously, put in relationship with an autostereoscopic optical selector preferably selected from the group comprising an array of linear lenses, an array of spherical lenses, a parallax barrier or an autostereoscopic screen.

Preferably, the interlaced image and the iridescent image according to the invention are obtained by the method according to the first advantageous variant described previously.

Advantageously, the iridescent image described previously is at least partially in 3D.

Another subject matter of the invention consists of a 3D iridescent image derived from a series of modified reference images obtained from reference images constituting a stereoscopic pair, the colours of which have been replaced by colours of a palette of colours by effecting, before or between each new modified reference image, a circular shift of the colours of the palette.

Another subject matter of the invention consists of an anti-counterfeit security image comprising an interlaced image described previously or obtained by the method according to the first advantageous variant described previously, or an iridescent image described previously or obtained by the method described previously, or a 3D iridescent image described previously.

Another subject matter of the invention consists of a 3D iridescent image comprising at least one interlaced image described previously, or obtained by the method according to the second advantageous variant described previously, configured so as to be observed through a non-autostereoscopic optical selector, and preferably a stereoscope or stereoscopic spectacles selected from the group comprising spectacles using coloured or polarising filters, LCD obturation spectacles, or prismatic spectacles. 3D image means an image that is perceived in three dimensions and may be static or dynamic. Thus the method according to the second advantageous variant described previously is applicable to static images or dynamic images such as those of 3D cinema, 3D television, 3D games consoles, 3D telephones, 3p computers, 3D video games and in general terms any 3D virtual interface.

Another subject matter of the invention consists of a device comprising an interlaced image as described previously or obtained by the method described previously, put in relationship with an autostereoscopic optical selector preferably selected from the group comprising an array of linear leases, an array of spherical lenses or a parallax barrier.

Such a device may, non-limitatively, be a bank or telephone card, a shop window, a package, a decoration, a garment or footwear marking, a ruler, a key fob, a flask, a bottle, a plate, a glass, a vase, a shade, a box, a block of etched glass, a communication element such as a business card, a press dossier, a booklet, a sign, an industrial marking, a publishing product such as a poster, a postcard, a greetings card, a bookmark, a file cover, a book, a notebook or copy book, an item of jewellery such as a bracelet, a pendant, a broach, the dial of a watch or clock, a tile or a glass panel.

Another subject matter of the invention consists of a computer program product able to be loaded into the memory of a control unit such as a computer, comprising means for implementing the method according to the first or second advantageous variant described previously.

Preferably, when the computer program product described previously comprises means for implementing the method described previously, it also comprises means for implementing a creation of 3D images Thus, in the case where the reference image or images derive from a 3D image creation program, the creation of the modified reference image may directly be generated by said program using a colour palette for the textures of all or some of the objects making up the scene and effecting a circular shift of the colours of the palette between the computing of the two images of the pair.

In the case of animated images, generated or not by a 3D image program, the method thus described may be concurrent with a circular shift of the palette acting on the animation.

BRIEF DESCRIPTION OF THE FIGURES

Other features, details and advantages of the invention will emerge from a reading of the following description, with reference to the accompanying figures, which illustrate:

FIG. 5, a diagram of a perspective view of an interlaced image put in relationship with an array of linear lenses;

FIG. 6, a diagram of the dispersed image and of the adapted array of linear lenses of FIG. 5 in front view.

For more clarity, the identical similar elements are marked by identical reference signs in all the figures.

DETAILED DESCRIPTION OF THE EMBODIMENTS

Referring to FIGS. 1A, 13, 2 and 3, the series of modified reference images IRM according to the invention is advantageously produced from a reference image IR and a palette of colours P by means of an image-processing computer program.

The reference image IR represents, to within the colours, what will be seen in the iridescent image II. Such a reference image is for example a photograph 4, a Pattern, a text 2, 3 or the like.

In general terms, the palette of colours defines the colours that will be perceived in the iridescence effects of the iridescent image. The colour palette in FIG. 1A contains here a graduation of black to white on its first half and from white to black on its second half. Other colours may optionally be used. Such a palette does not comprise here any clean colour break area, not even between the first and last colour. This makes it possible to obtain a very smooth iridescence effect. For aesthetic reasons it may also be wished to define the colour break areas in the palette.

Interestingly, the invention is implemented without requiring a marking of the colours to be printed, and the colour palette comprises either a single colour layer, in bitmap or grey level, or two layers of colours the lightest of which preferably has a constant value over the whole of said colour palette.

According to another variant that is not shown, the invention is implemented with colour marking means, and the colour palette comprises as many layers of colours as the reproduction system used so permits, typically cyan magenta yellow black (CMYB) or red green blue (RGB). It is also possible to use an RGB palette, to generate modified RGB reference images, to interlace them, then to convert the interlaced image into CMYB; or to convert the modified reference images IRM or any other combination of this type.

Figure 3:
FIG. 3, a series of eight, modified reference images -IRM- in which the colours of the reference image in FIG. 2 are replaced by the colours of the palette in figure IA by effecting, between each IRM, a circular shift of the colours of the palette as in FIG. 13.

The series of modified reference images IRM in FIG. 3 also represents what will be perceived of the iridescent image observed at various angles and making it possible to obtain the iridescence effect. Such iridescent effects may also be created on a 3D image visible directly or with 3D spectacles.

Referring to FIGS. 1A, 1B, 2 and 3, the number nCoulPalette of colours contained in the palette is defined, and then the number nIRM of modified reference images to be calculated is defined: nIRM is less than or equal to the resolution of the restitution system divided by the resolution of the optical selector used, the series of modified reference images -IRM- is obtained by replacing the colours of the reference image -IR- by the colours of the palette by effecting, between each new IRM, a circular shift of the colours of the palette (Palette shifting—Colour cycling) detailed below.

In order to obtain a complete cycle, the circular shift value DC to be given to the palette before or between each new calculation of a modified reference image is given by the formula:

$$DC = nCoulPalette/Nirm$$

It may also be advantageous, for aesthetic purposes, to effect more than one cycle or less than one cycle. Hereinafter, there are successively created a first modified reference image IRM0 by replacing its colours with those of the palette of FIG. 1A, a second modified reference image IRM1 by effecting a first shift of the palette as on the shifted palette d1 of FIG. 1B, a third modified reference image IRM2 by effecting a second shift of the palette as on the shifted palette d2 of FIG. 1B, and so on as far as the eighth modified reference image IRM7.

The shift is done in a circular manner so that the shifted palette colours dp1 . . . dp10 . . . follow each other and beyond the last colour d1p10 there is the first colour d1p1.

At least two of the modified reference images obtained can then be interlaced in order to form an interlaced image according to the invention. Thus the interlaced image of FIG. 4 consists of the eight modified reference images IRM 0-7.

The interlaced image obtained from the series of modified reference images by an interlacing according to the prior art comprising the steps of horizontal resizing of each IRM to the size required for the iridescent image and to the resolution of the optical selector -SO-, creating the interlaced image -IE- by successively taking each column of said resized images obtained at the previous step, adapting the vertical size of the interlaced image obtained at the previous step to the required size of the iridescent image.

Before the forming of the interlaced image IE, it is preferable to precisely adapt the size of said interlaced image IE according to the optical selector SO used and the mean observation distance defined according to the application envisaged. The modification coefficient of the size is defined according to the well known prior art (adjustment of pitch) by putting a nomogram in relationship with the optical selector SO under the same conditions as the final putting in relationship. The nomogram consists of a periodic image with a basic period, black pixels white pixels and contains areas with various size modifications. The one that is suitable is the one that allows very rapid passage from black to white when the observer is placed at the mean distance defined and moves slightly perpendicular to the lenses.

The interlaced image -IE- is put in relationship with an array of cylindrical lenses SO in order to produce an iridescent image.

Figure 4:
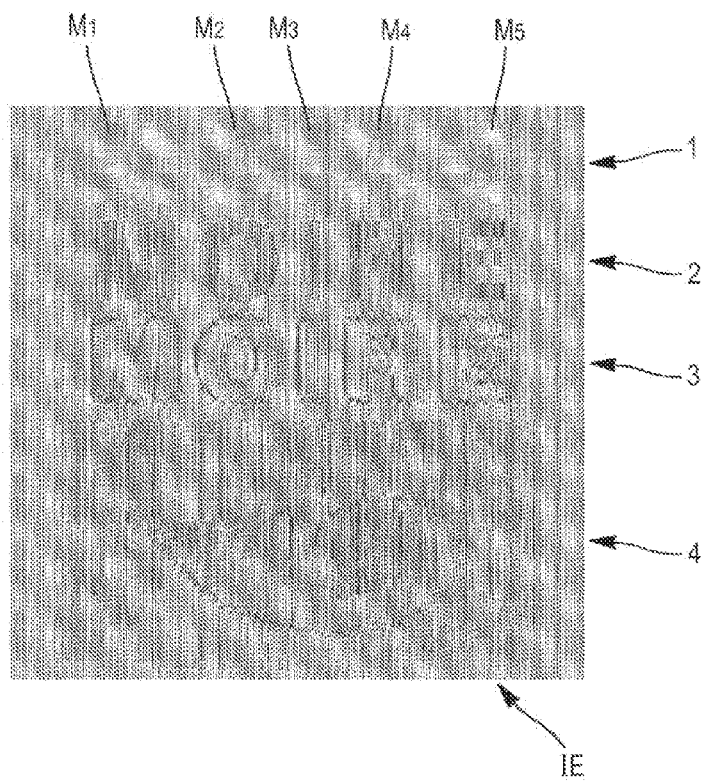
FIG. 4, an interlaced image obtained from the series of modified reference images in FIG. 3.

The application of fuzziness to the reference image makes it possible to display a characteristic border bc around the drawing in the series of modified reference images IRM of FIG. 3, which is also perceptible in the interlaced image IE of FIG. 4 and will also be visible in the iridescent image. When there is no application of fuzziness in the reference image, the interlaced image shows sharp breaks, and the iridescent image will not show a characteristic border essentially because of the absence of fuzziness in the reference image.

Furthermore, the iridescent image will show iridescent visual effects that are light and dark depending on the observation angle, and the area of the image observed as illustrated in FIG. 3.

Figure 1A:
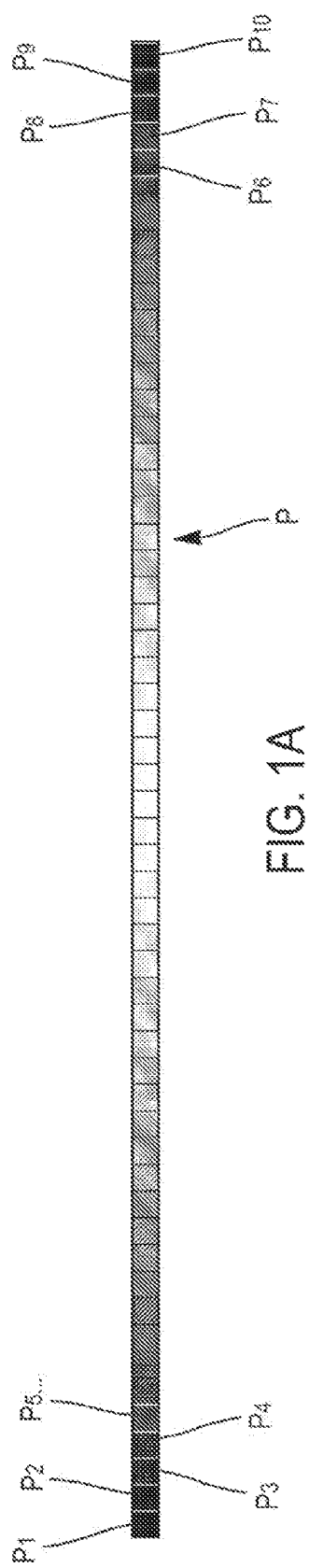
FIG. 1A, a colour palette for creating an iridescent image according to the invention.
Figure 1B:
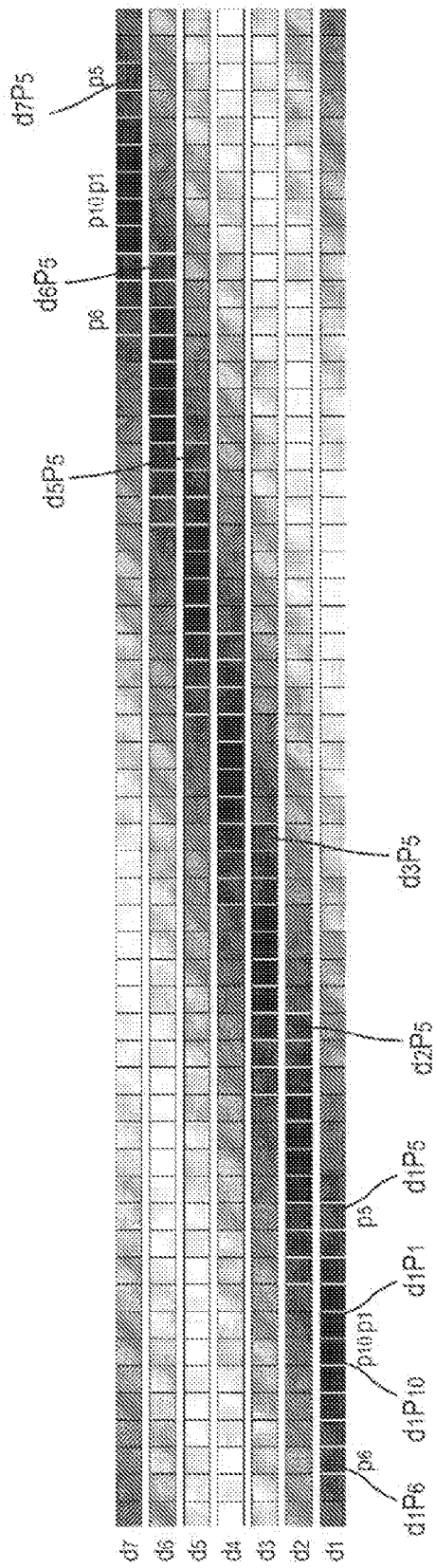
FIG. 1B, the palette of FIG. 1 with various circular shifts of the colours.
Figure 2:
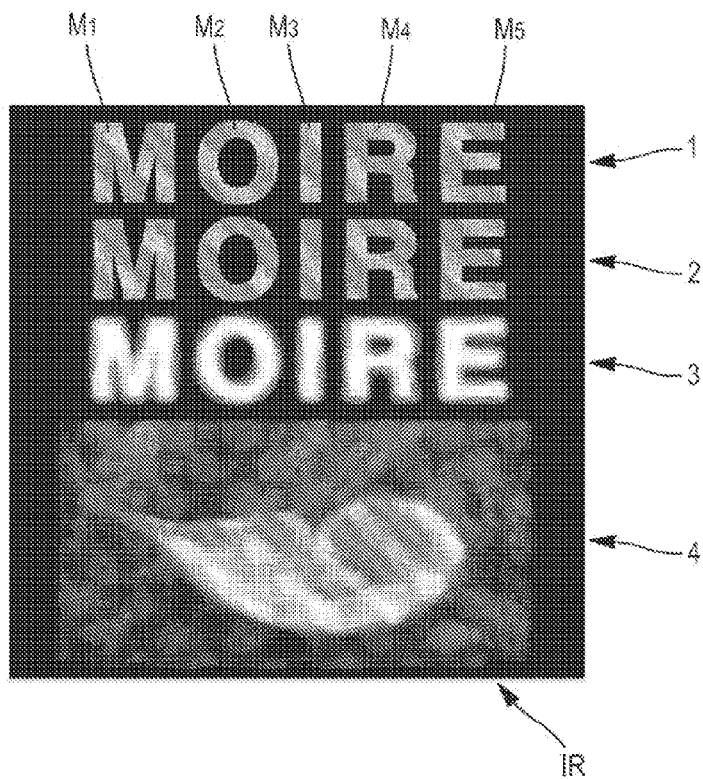
FIG. 2, a reference image.

The reference image IR in FIG. 2 comprises a text composed of five masks M1 to M5, a non-fuzzied text 2, a fuzzied text 3 and a photograph 4 in grey level.

According to a preferred variant, it is possible to use a mask on the reference image as in FIG. 2 when the modified reference images -IRM- are created. These, as in FIG. 3, were created using five masks on the IR in order to form reserve areas the colours of which have not been replaced by those of the palette and will therefore not present any iridescence effect.

According to another preferred variant, use can also be made of masks in the reference image in order to utilise several colour palettes when the modified reference images (not shown) are created.

The use of a mask (not shown) may also consist of bonding elements in the modified reference images -IRM- or in the interlaced image -IE- before formation thereof
- either in total replacement,
- or with an opacity value,
- or using a fusion mode.

The last two uses make it possible in particular to obtain on a photograph a mixture of the original photograph and iridescence effect.

The use of a mask (not shown) may also consist of applying a colorimetric filter on the modified reference images or on the interlaced image.

According to a preferred variant (not shown), it is possible to change colour palette when the series of modified reference images -IRM- is generated.

FIGS. 5 and 6 illustrate an example of putting an array of lenses SO and an interlaced image IE in relationship. The interlace image IE is intended to be for example printed on the opposite face of the array of lenses SO or laminated thereon. A spacing -d- must be provided between the array of lenses and the interlaced image according to the focal distance of the cylindrical lenses.

The putting in relationship consists of assembling the interlaced image with the optical selector SO in order to obtain the iridescent image. When the optical selector SO consists of lenses (linear or spherical) the interlaced image IE must be situated substantially at the focal distance of said lenses. In general the thickness of the arrays of lenses that are found commercially meets this requirement so that the image must be situated on the face opposite to the lenses (cf. FIGS. 5 and 6), When the optical selector SO is a parallax barrier it is necessary to provide a distance between the barrier and the interlaced image IE. To obtain an iridescence effect, that is to say so that the two eyes of the observer perceive different images, it is necessary to ensure that this distance is not too small.

The iridescent image is created by a method that comprises steps consisting of:

(1) Creating the reference image IR comprising elements such as a drawing, a photograph, a text, a pattern, etc.

(2) Creating a palette of colours that will represent the colours of the iridescence effect in the iridescent image.

(3) Creating a series of at least two "modified reference images" IRM1, IRM2, IRMn, in which the colours of the reference image -IR- are replaced by colours of the palette by effecting, between each new IRM, a circular shift of the colours of the palette. Optionally it will be possible to make use of masks in order to utilise several different colour palettes or to preserve areas that will not have iridescence effects, or to bond elements or apply a colorimetric filter.

(4) Creating an interlaced image -IE- from said modified reference images -IRM-. Optionally it would be possible to make use of masks in order to bond elements or apply a colorimetric filter.

(5) Producing the iridescent image by putting the interlaced image -IE- in relationship with the optical selector, which may consist of a direct printing on the face of the optical selector opposite to the observer, a printing followed by a bonding against this face, or any other form of reproduction.

The means for producing modified reference images and the interlaced image intended for producing the iridescent image according to the invention are preferably implemented by computer, using an image-processing software. The interlaced image obtained is then generated and put in relationship with an optical selector in the way explained previously.

In the case of the use of a lenticular array consisting of cylindrical lenses or a parallax barrier consisting of lines, these must be vertical in order to obtain the best iridescence effect. However, it may be advantageous to incline the lines or lenses by an angle alpha of 25 to 65 degrees. The iridescence effect is then still preserved and the support in addition has the advantage of coming alive when it is pivoted from bottom to top.

This inclination can be obtained by means of the following steps—inclination of the modified reference images -IRM- by alpha degrees, creating the interlaced image -IE- from the inclined modified reference images created at the previous step, creating the iridescent image by putting the interlaced image -IE- created at the previous step in relationship with the optical selector SO. The iridescent image can then be inspected by returning it by minus alpha degrees.

It should be noted that, in the case of a parallax barrier put in relationship with an interlaced image, it is possible as required to decide to place one or other in front or behind. Adjustment of the pitch will take account of this choice.

The invention is not limited to the embodiments disclosed above. For example, numerous combinations can be envisaged without departing from the scope of the invention.

The invention claimed is:

1. Method for producing an iridescent image from at least one reference image comprising a production of a series of modified images intended to form an iridescent image from at least one reference image, wherein the method comprises steps of:
- creating a palette of colours (P),
- creating a series of at least two modified reference images (IRM 0, IRM 1, IRM 2, IRM n, . . . ), in which the colours of said at least one reference image (IR) are replaced by colours of the palette by effecting, before or between each new modified reference image (IRM), a circular shift of the colours of the palette, and
- creating an interlaced image from said at least two modified reference images,
- creating an iridescent image from said interlaced image, in which the series of at least two modified reference images in said interlaced image is put in relationship with an optical selector enabling an observer to perceive with his two eyes different images in said series.

2. Method according to claim 1, wherein the method also comprises a step of applying a fuzziness to all or part of said at least one reference image, before the step of creating the modified reference images (IRM).

3. Method according to claim 1, wherein the step of creating said modified reference images (IRM) is performed by means of at least one mask covering at least part of the reference image.

4. Method according to claim 1, wherein the colours of the palette of colours represent either a single layer of colour, in bitmap or grey level, or two layers of colours the lightest of which has a constant value over the whole of said palette of colours, or three red green blue layers, or four cyan magenta yellow black layers.

5. Method according to claim 1, wherein the series of modified reference images is configured so as to be observed through a non-autostereoscopic optical selector preferably selected from the group comprising a stereoscope or stereoscopic spectacles selected from the group comprising spectacles using coloured or polarising filters, LCD obturation spectacles or prismatic spectacles.

6. Method according to claim 1, wherein the method comprises a step of creating at least two reference images from a series of preference images selected from the group comprising a multiscopic series, an animation, and the step of creating a series of modified reference images is then performed on each of said at least two reference images in order to create for each of them at least one modified reference image.

7. Method according to claim 1, wherein the method also comprises a step of putting the interlaced image in relationship with an autostereoscopic optical selector in order to obtain an iridescent image, the autostereoscopic selector preferably being selected from the group comprising an array of cylindrical lenses, an array of spherical lenses, a parallax barrier or an autostereoscopic screen.

8. Computer program product able to be loaded into the memory of a control unit, comprising a program code recorded on a non-transitory medium that can be read by a computer, for implementing the steps of the method according to claim 1 when said program functions on a computer.

9. Computer program product according to claim 8, wherein the computer program product also comprises a program code recorded on a non-transitory medium that can be read by a computer, for implementing a 3D image creation when said program is executed on a computer.

10. A system for delivering an interlaced image for viewing comprising:
  a server with a processor,
  a data store containing at least one reference image and a colour palette, and
  an optical selector;
  wherein said interlaced image is derived by said processor from a series of at least two modified reference images (IRM 0, IRM 1, IRM 2, IRM n . . . ) in said data store, said at least two modified reference images obtained from at least one reference image, the colours of said at least two modified reference images have been replaced by the colours of a palette of colours by performing, before or between each new modified reference image, a circular shift of the colours of the palette, and wherein the interlaced image forms an iridescent image in which the series of at least two modified reference images is put in positional relationship with the optical selector to enable an observer to perceive with his two eyes the different images in the series.

11. The system according to claim 10, wherein the optical selector is an autostereoscopic optical selector preferably selected from the group comprising an array of linear lenses, an array of spherical lenses or a parallax barrier.

12. The system according to claim 11, wherein the iridescent image is at least partially in 3D.

13. The system according to claim 10, wherein said device is selected from the group comprising a bank card, a telephone card, a shop window, a package, a decoration, a garment marking, a footwear marking, a ruler, a key fob, a flask, a bottle, a plate, a glass, a vase, a shade, a box, a block of etched glass, a communication element, a business card, a press dossier, a booklet, a sign, an industrial marking, a publishing product, a poster, a postcard, a greetings card, a bookmark, a file cover, a book, a notebook, a copy book, an item of jewelry, a bracelet, a pendant, a broach, the dial of a watch, the dial of a clock, a tile and a glass pane.

14. A device for delivering a 3D iridescent image to a viewer comprising
  a processor,
  a data store containing at least one reference image and a colour palette, and
  an optical selector;
  wherein said 3D iridescent image is derived by said processor from a series of modified reference images obtained from reference images constituting a stereoscopic pair stored in said data store, the colours of which have been replaced by said processor by the colours of a colour palette by performing, before or between each new modified reference image, a circular shift of the colours of the palette, and wherein the series of modified reference images in the iridescent image are put in positional relationship with the optical selector to enable an observer to perceive with his two eyes the different images in said series.

* * * * *